United States Patent Office 2,929,292
Patented Mar. 22, 1960

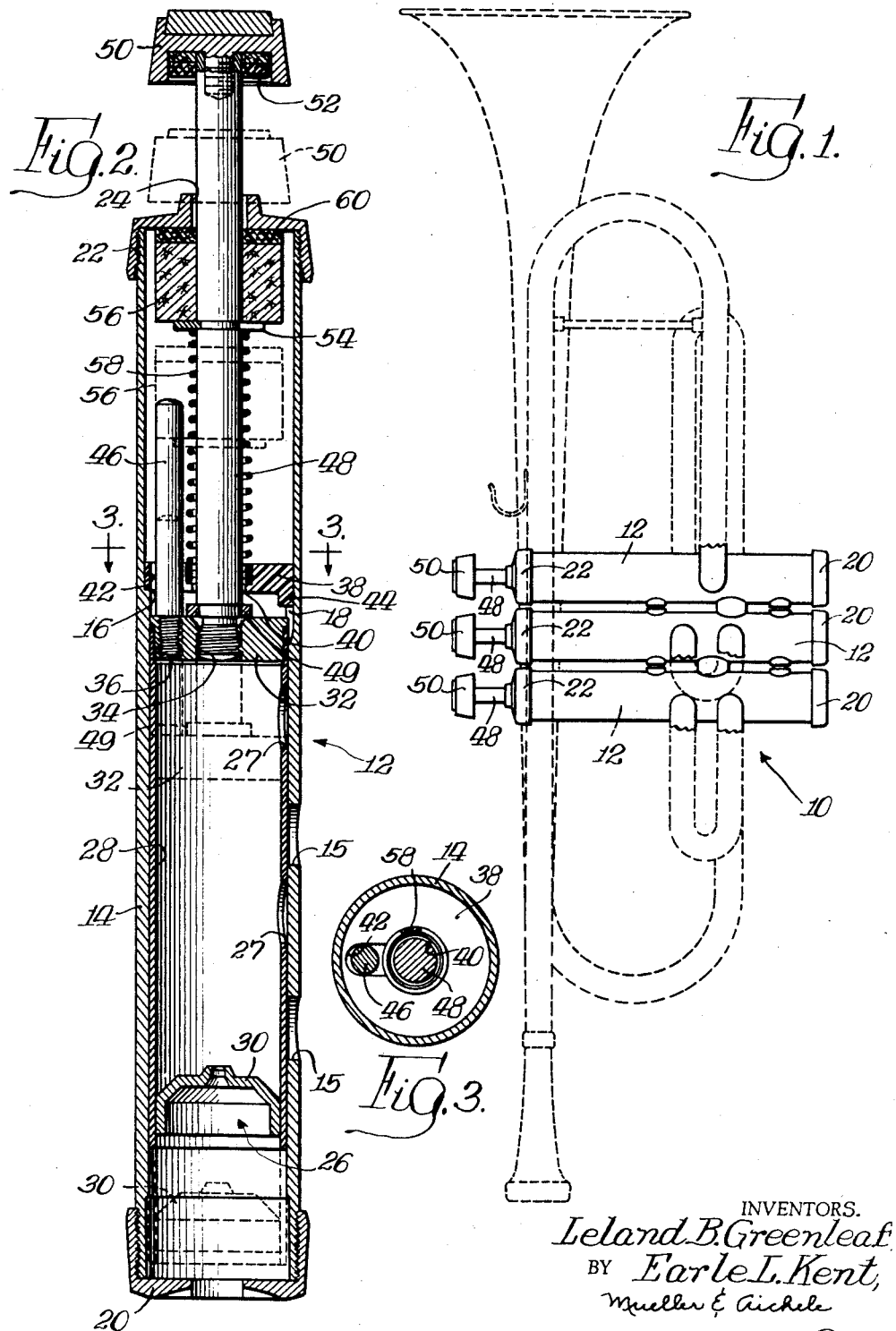

2,929,292

TOP SPRING VALVE MECHANISM

Leland B. Greenleaf and Earle L. Kent, Elkhart, Ind., assignors to C. G. Conn Ltd., Elkhart, Ind., a corporation of Indiana Application January 14, 1957, Serial No. 633,924

1 Claim. (Cl. 84—388)

This invention relates to a new and improved valve construction for brass-wind instruments such as cornets, trumpets and the like.

In valves for trumpets, cornets and the like, a cylindrical type slide valve is usually employed which controls the direction of air flow in a valve casing according to the position of the slide valve. It is essential in a valve for a brass-wind instrument that the valve be prevented from rotation to keep the valve passages in proper alignment and that frictional noises be reduced to the minimum possible.

It is therefore one of the objects of this invention to provide a new and improved valve construction for brass-wind instruments which is simply and inexpensively manufactured and smoother in operation than prior valve constructions.

Another object of this invention is to provide a new and improved valve construction for a brass-wind instrument in which frictional and vibrational noises are minimized and valve bounce and spring sing are substantially eliminated.

One of the features of this invention is the provision in a valve construction for a brass-wind instrument of a guide plate which cooperates with a valve guide pin and valve return spring to provide a smoother and substantially noise-free operation.

Another feature of this invention is the provision in a valve construction for a brass-wind instrument of an improved guide plate for a valve guide pin and valve return spring and means on the valve piston to facilitate removal of the guide plate during disassembly of the valve.

Another feature of this invention is the provision in a valve construction for a brass-wind instrument of a resilient stop means for the slide valve to reduce noise and bounce at the termination of upward movement of the valve.

In the accompanying drawings, to be taken as part of this specification, there is clearly and fully illustrated a preferred embodiment of this invention, in which drawings:

Fig. 1 is a view showing the exterior of the improved slide valve assemblies which make up this invention and showing in dotted lines the relation of the slide valve assemblies to a cornet or trumpet construction, Fig. 2 is a longitudinally sectional view of one of the improved valve assemblies, and Fig. 3 is a view in section taken on the line 3—3 of Fig. 2 and showing the relation of the valve stem and guide pin to the guide plate.

In this invention there is provided an improved valve assembly for a brass-wind instrument. The valve assembly includes a tubular casing with closed top and bottom ends and a cylindrical slide valve therein. A guide plate (preferably of a molded plastic, such as nylon) is provided within the valve casing and has a central aperture and a slot adjacent thereto. The slide valve is provided with a valve stem which extends upwardly through the aperture in the guide plate and through the top closure. The slide valve is also provided with a guide pin which has a sliding fit in the guide plate slot and prevents rotation thereof. A spring is coiled closely around the valve stem and extends between the guide plate and a collar on the valve stem and urge the slide valve to an upper position. The valve stem has a stop member of a sound deadening material which is engageable with the top closure of the valve casing and reduces valve bounce. The guide plate provides a smoother guiding action for the valve stem and guide pin and reduces frictional noises. The top of the slide valve is provided with abutment means to engage the guide plate and facilitate withdrawal thereof during disassembly of the valve assembly.

In Fig. 1 there is shown a cornet or trumpet assembly 10 having three slide valve assemblies 12 connected together in the usual manner. The valve assembly 12, as shown in Figs. 2 and 3, comprises a valve casing 14 of tubular or cylindrical construction with apertures 15 therein and having an inner circumferential flange 16 with a notched portion 18 therein. The lower end of the valve casing 14 is closed by a lower cap member 20 which is threadedly secured in place. The upper end of the valve casing 14 is closed by an upper thread cap member 22 which is threadedly secured in place and which has a sleeved opening 24 therein.

Within the valve casing 14 and positioned below the shoulder 16 there is a slide valve assembly 26. The slide valve assembly 26 includes a tubular piston casing 28 having apertures 27 therein and which is closed at its lower end by a bottom closure or dished plate member 30. The upper end of the piston casing 28 is closed by an upper closure or plate member 32 which has a central threaded aperture 34 and an offset threaded aperture 36 therein. The piston casing may have a conventional core structure or other means providing passages between the apertures 27.

Within the valve casing 14 and positioned above the slide valve 26 there is a guide plate 38 made of plastic, metal or other suitable material. A molded thermoplastic such as nylon, is preferred, since its resilience tends to reduce vibrational noises. The plate 38 is supported on the circumferential shoulder 16 and has a dog portion 44 which fits the notched portion 18 and prevents rotation of the guide plate. The guide plate 38 has a central aperture 40 and a slot 42 opening from the central aperture. The guide plate 38 and the aperture 40 and slot 42 therein are formed with very accurate dimensions and very smooth surfaces wherever frictional contact is to be had to reduce to a minimum the generation of noise.

A very smoothly machined guide-pin 46 is threadedly secured in the offset aperture 36 in the top-plate 32 of the slide valve 26. The guide pin 46 has a sliding fit in the slot portion 42 in the guide plate 38. A valve stem 48 is threadedly secured in the central aperture 34 in the top-plate 32 of the slide valve 26 and has a spacing washer 49 thereabout. The valve stem 48 extends upwardly in the central aperture 40 in the guide-plate 38 and through the sleeved opening 24 in the top valve cap 22. The valve stem 48 has a finger pad 50 supported on the upper end thereof for actuation of the valve stem and the slide valve. On the underside of the finger pad 50 there is supported a sound deadening material 52 which may be felt or which may preferably be a foam plastic which functions to eliminate noise produced by contact between the finger pad 50 and the valve cap 22 upon full downward movement of the slide valve 26.

The valve stem 48 has a collar member or washer 54 supported thereon which abuts a cork spacer member 56. Between the cork spacer member 56 and the valve cap 22 there is positioned a sound deadening member or washer 60 of felt or other sound deadening material, such as a foam plastic. The sound deadening washer 60 may either be secured to the underside of the valve cap 22 or may be secured to the spacer member 56 and is operable to reduce substantially the noise produced upon termination of the upward movement of the slide valve. A spring 58 is positioned between the collar member 54 and the valve guide plate 38 and surrounds the valve stem 48 closely at the upper end portion thereof and has a substantial clearance at the lower end. The close proximity of the spring 58 to upper end of the valve stem 48 is operable to reduce vibration of the spring and thus substantially eliminates "sing" of the spring which might otherwise be produced.

In operation this valve assembly functions as a conventional slide valve for a trumpet, cornet or the like. The actuation of the finger pad 50 moves the valve stem 48 and the slide valve 26 to change the registry of the apertures 27 and 15 to insert or cut out lengths of tubing and thus change the total length of the horn to produce different notes upon the instrument. The use of an improved sound deadening washer 60 of foam plastic functions to reduce substantially the amount of noise produced upon upward movement of the slide valve by the valve return spring 58. The close proximity of the spring 58 to the valve stem 48 functions to reduce valve spring "sing" as was previously pointed out. The guide plate 38 is provided with a central aperture and guide slot which reduces frictional noises produced by movement of the guide pin 46 through the slot 42. The guide plate 38 also functions as a vibration damper for the return spring 58 and further reduces any tendency of the spring to "sing." The washer 49 is of sufficient thickness to engage the bottom of the plate 38 on disassembly of the valve before the valve plate 32 engages the key 44 in the plate 38. This prevents cocking of the plate 38 which might cause it to jam and make the disassembly of the valve more difficult. The threaded connection of the guide pin 46 and the valve stem 48 is preferred to a welded or soldered connection inasmuch as this connection permits assembly of the guide pin and valve stem without distortion of the piston casing 28 which might otherwise take place during a soldering operation.

We claim:

In a brass-wind instrument, a cylindrical valve casing having an internal circumferential shoulder with a notched portion, a bottom valve cap closing the bottom of said valve casing, a top valve cap having a sleeved opening and closing the top of said valve casing, a slide valve positioned below said shoulder in said valve casing and comprising a cylindrical piston casing having a smooth sliding fit therein, a top plate closing the top end of said piston casing and having a central opening and an offset opening, a guide plate having a central opening and a slot adjacent thereto and having a projecting key portion, said guide plate being adapted to be positioned in said valve casing on said shoulder with said key portion extending into said notched portion and said central opening and said slot aligned with the central and offset openings of said slide valve top plate, a guide pin secured in the offset opening in said top plate and extending through and having a sliding fit in the slot in said guide plate, a valve stem secured in the central opening in said top plate and extending upwardly through the central opening in said guide plate and through the sleeved opening in said top valve cap, said valve stem being operable to move said slide valve within said valve casing, a spring coiled about and cooperable with said valve stem and said guide plate to urge said valve stem upwardly, and an abutment member carried on said slide valve top plate which projects above the surface thereof a distance greater than the downwardly projecting key portion of said guide plate and adapted to engage said guide plate upon withdrawal of said slide valve from said valve casing to prevent cocking of the guide plate during withdrawal of the same from the valve casing.

References Cited in the file of this patent

UNITED STATES PATENTS

| | | |
|---|---|---|
| 1,547,272 | Tottle | July 28, 1925 |
| 1,716,917 | Carlson | June 11, 1929 |
| 1,938,321 | Dausman | Dec. 5, 1933 |
| 2,404,818 | Swinehart | July 30, 1946 |
| 2,612,811 | Meyers | Oct. 7, 1952 |
| 2,798,401 | Miller | July 9, 1957 |